United States Patent
Ferrari et al.

(10) Patent No.: US 11,778,074 B2
(45) Date of Patent: Oct. 3, 2023

(54) OPERATING MORE THAN ONE WIRELESS COMMUNICATION PROTOCOL WITH A HEARING DEVICE

(71) Applicant: Sonova AG

(72) Inventors: Federico Ferrari, Bern (CH); Amre El-Hoiydi, Neuchâtel (CH)

(73) Assignee: Sonova AG, Staefa (CH)

( * ) Notice: Subject to any disclaimer, the term of this patent is extended or adjusted under 35 U.S.C. 154(b) by 235 days.

(21) Appl. No.: 17/293,058

(22) PCT Filed: Nov. 14, 2018

(86) PCT No.: PCT/EP2018/081136
§ 371 (c)(1),
(2) Date: May 12, 2021

(87) PCT Pub. No.: WO2020/098925
PCT Pub. Date: May 22, 2020

(65) Prior Publication Data
US 2021/0409522 A1 Dec. 30, 2021

(51) Int. Cl.
*H04L 29/06* (2006.01)
*H04L 69/14* (2022.01)
(Continued)

(52) U.S. Cl.
CPC .......... *H04L 69/14* (2013.01); *H04R 25/43* (2013.01); *H04R 25/552* (2013.01);
(Continued)

(58) Field of Classification Search
CPC ... H04W 72/1263; H04W 4/80; H04W 72/00; H04L 69/14; H04L 29/06; H04L 12/04; H04L 12/5691; H04J 3/06; H04R 25/00
See application file for complete search history.

(56) References Cited

U.S. PATENT DOCUMENTS 9,246,522 B1 * 1/2016 Wong ................ H04W 72/1215
10,003,896 B2 6/2018 Pedersen et al.
(Continued)

FOREIGN PATENT DOCUMENTS

CN 101682540 A 3/2010
CN 101690295 A 3/2010
(Continued)

OTHER PUBLICATIONS

European Patent Office, International Searching Authority, International Search Report for PCT/EP2018/081136, dated Jun. 4, 2019, Rijswijk, Netherlands.

*Primary Examiner* — Mewale A Ambaye
(74) *Attorney, Agent, or Firm* — ALG Intellectual Property, LLC

(57) ABSTRACT

The disclosed technology includes a method to wirelessly communicate with a wireless communication device using two wireless communication protocols. The method includes: aligning a timing of audio frames of a first wireless communication protocol with a timing of advertising events of a second wireless communication protocol; increasing a time duration between beginnings of advertising Protocol Data Units (PDUs) transmitted during an advertising event of the second wireless communication protocol; receiving a first request to access a transceiver of the wireless communication device from the first wireless communication protocol and receiving a second request to access the transceiver of the wireless communication device from the second wireless communication protocol; and selecting the second request from the second wireless communication protocol to be executed based on priority of the second wireless communication protocol. The method can be used during audio streaming.

20 Claims, 7 Drawing Sheets

(51) Int. Cl.
  *H04R 25/00* (2006.01)
  *H04W 72/12* (2023.01)
  *H04W 4/80* (2018.01)
  *H04W 72/1263* (2023.01)
  *H04W 56/00* (2009.01)

(52) U.S. Cl.
  CPC ............ *H04R 25/554* (2013.01); *H04W 4/80* (2018.02); *H04W 72/1215* (2013.01); *H04W 72/1263* (2013.01); *H04R 2225/55* (2013.01); *H04W 56/001* (2013.01)

(56) References Cited

U.S. PATENT DOCUMENTS

| | | | |
|---|---|---|---|
| 2008/0279163 A1* | 11/2008 | Desai | H04W 72/1215 370/328 |
| 2010/0079356 A1* | 4/2010 | Hoellwarth | H04B 1/385 345/8 |
| 2012/0327920 A1 | 12/2012 | Xhafa et al. | |
| 2016/0287166 A1* | 10/2016 | Tran | A61B 5/74 |
| 2017/0265025 A1* | 9/2017 | Deck | H04W 4/80 |
| 2017/0353365 A1 | 12/2017 | Li et al. | |

FOREIGN PATENT DOCUMENTS

| | | | |
|---|---|---|---|
| CN | 105284055 A | 1/2016 | |
| CN | 106851825 A | 6/2017 | |
| WO | 2018/145756 A1 | 8/2018 | |
| WO | WO-2018145756 A1 * | 8/2018 | ........... H04R 25/554 |

* cited by examiner

OPERATING MORE THAN ONE WIRELESS COMMUNICATION PROTOCOL WITH A HEARING DEVICE

TECHNICAL FIELD

The disclosed technology generally relates to wireless communication. More specifically, the disclosed technology relates to a hearing device operating two wireless communication protocols.

BACKGROUND

Hearing devices can execute several wireless communication protocols. For example, hearing devices can use Bluetooth Basic Rate/Enhanced Data Rate™ (Bluetooth BR/EDR™), Bluetooth Low Energy™, a proprietary protocol (e.g., Roger™), or other protocols (e.g., a television streaming protocol). A hearing device may use Bluetooth BR/EDR™ for streaming music and use Bluetooth Low Energy™ for advertising its status to a smartphone. Also, a hearing device may use a proprietary protocol to communicate between hearing devices, e.g., to communicate binaurally or bimodally. For example, a first hearing device can transmit audio to a second hearing device during a wind noise canceling operation.

Even though hearing devices can use several wireless communication protocols, hearing devices may experience technical issues when using several protocols, especially if the protocols are used simultaneously, separately, or sporadically. For example, a hearing device may be binaurally streaming while advertising to connect to a remote computer device with Bluetooth Low Energy™. Accordingly, a need exists to address at least the above identified problem and provide additional benefits.

U.S. Pat. No. 7,801,099 titled "Cooperative Transceiving Between Wireless Interface Devices of a Host Device with Acknowledge Priority," filed May 10, 2007, discloses a wireless communication device configured to use two different protocols (e.g., Wireless Local Area Networks (WLAN) and Bluetooth™). The patent discloses using two different protocols. Specifically, the patent discloses a first wireless interface device that transmits a first outbound packet in accordance with a first wireless communication protocol at a first power level and a first rate during a first time interval and that transmits a second outbound packet at a second power level and a second rate during a second time interval, wherein the first power level is less than the second power level and wherein the second rate is less than the first rate. A second wireless interface device transceives data between the host module and a second external device during the second time interval in accordance with a second wireless communication protocol.

Although this technology provides one solution for addressing wireless communication problems with two wireless communication protocols, it does not disclose how to address several problems, e.g., how to maintain a connection with an external device and stream audio between hearing devices using two different protocols.

SUMMARY

The disclosed technology includes a method to wirelessly communicate with two wireless communication protocols. The method comprises the following operations: aligning a timing of audio frames of a first wireless communication protocol with a timing of advertising events of a second wireless communication protocol to reduce overlapping requests to access a transceiver (e.g., shared transceiver) from the first wireless communication protocol and the second wireless communication protocol (e.g., the first wireless communication protocol is a binaural streaming wireless protocol and the second wireless communication protocol is Bluetooth Low Energy™).

The method can further comprise: increasing a time duration between beginnings of advertising packets transmitted during an advertising event of the second wireless communication protocol (e.g., from 1500 microseconds to 5000 microseconds); receiving a first request to access a transceiver (e.g., shared transceiver) of the wireless communication device from the first wireless communication protocol and receiving a second request to access the transceiver of the wireless communication device from the second wireless communication protocol (e.g., wherein the first and second request can be received simultaneously); and selecting the second request from the second wireless communication protocol to be executed based on priority of the second wireless communication protocol over the first wireless communication protocol. Optionally, the method can include transmitting the selected request (e.g., transmitting the selected request to the transceiver and the transceiver can transmit the selected request to a wireless communication device as part of an advertising its status).

Optionally, increasing the time duration causes the time duration between beginnings of two consecutive advertising packets transmitted during an advertising event of the second wireless communication protocol to be a multiple of a duration of an audio frame of the first wireless communication protocol.

Optionally, the aligning causes the time duration between beginnings of two consecutive advertising events of the second wireless communication protocol to be a multiple of a duration of an audio frame of the first wireless communication protocol.

Optionally, the method can include determining that the wireless communication device is bidirectionally streaming audio.

Optionally, the first wireless communication protocol can be a synchronous low-latency audio streaming protocol, wherein low-latency includes end-to-end audio latency of less than 20 milliseconds.

Optionally, the method can include increasing the time duration between beginnings of advertising packets transmitted during an advertising event of the second wireless communication protocol such that it reduces a probability of an advertising packet of the second wireless communication protocol colliding with a reception or transmission attempt of the first wireless communication protocol.

Optionally, the method can also include determining that audio streaming is no longer occurring; and discontinuing to time align the first and second wireless communication protocols.

Optionally, the method can also include determining that the hearing device is no longer streaming audio; discontinuing the time aligning of the timing of audio frames of the first wireless communication protocol with the timing of advertising events of the second wireless communication protocol; and decreasing the time duration between beginnings of advertising packets transmitted during an advertising event of the second wireless communication protocol.

A wireless communication device can store the method in its memory as a computer program and execute the computer program to carry out the method. The wireless communication device can be a hearing device, wherein the hearing device is configured to carry out a binaural streaming protocol.

The disclosed technology also includes a hearing device, the hearing device comprising a memory storing a first wireless communication protocol and a second wireless communication protocol, the first wireless communication protocol for streaming audio, and the second wireless communication protocol configured to transmit or receive advertising packets on one or more advertising channels; a controller, electronically coupled to the memory, for controlling transmission and/or reception of packets based on requests from the first wireless communication protocol and second wireless communication protocol; and a transceiver, electronically coupled to the controller, for transmitting or receiving the packets (e.g., a shared transceiver, which generally means the first and second wireless communication protocols share it).

The controller can be configured to increase a time duration between beginnings of advertising packets transmitted during an advertising event of the second wireless communication protocol, time align the first wireless communication protocol and the second wireless communication protocol to reduce overlapping requests to access a shared transceiver from the first wireless communication protocol and the second wireless communication protocol, and select a request from the second wireless communication protocol over a request from the first wireless communication protocol based on priority of the second wireless communication protocol.

Figure 1:
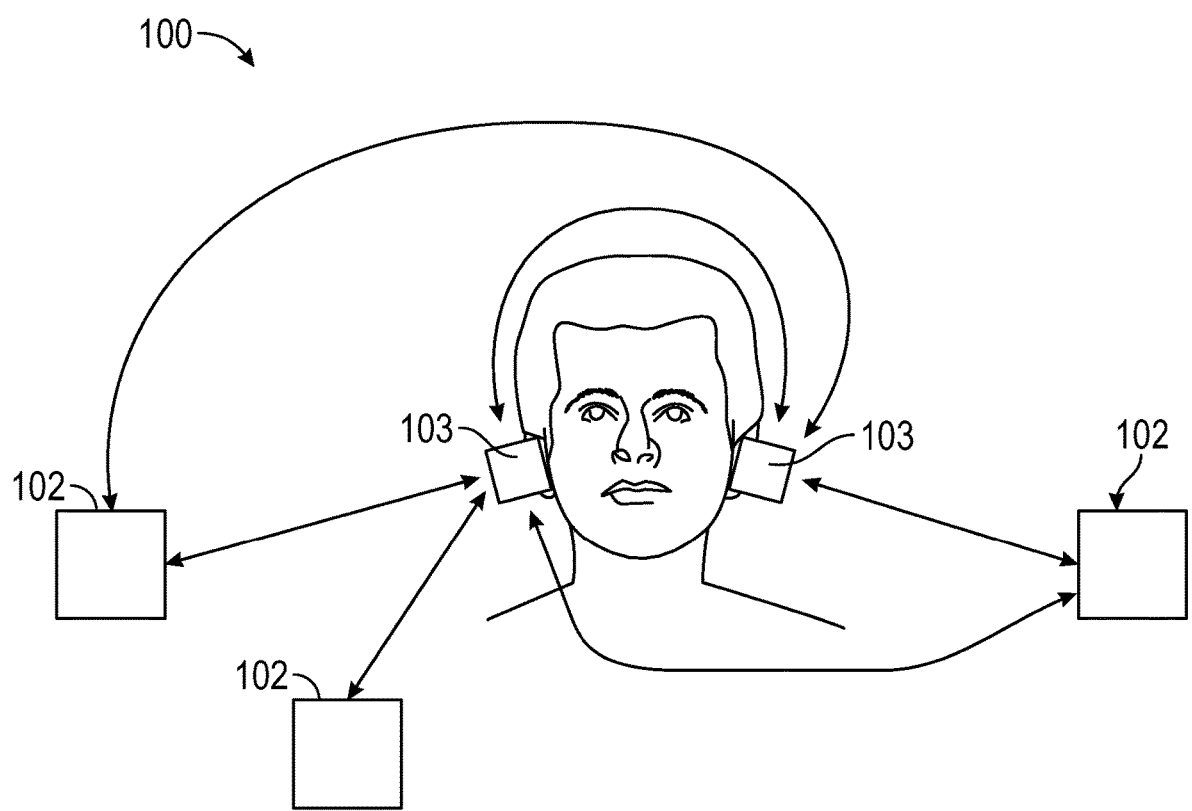
FIG. 1 illustrates a communication environment in accordance with some implementations of the disclosed technology.

The drawings are not drawn to scale. Some components or operations may be separated into different blocks or combined into a single block for the purposes of discussion of some of the disclosed technology. Moreover, while the technology is amenable to various modifications and alternative forms, specific implementations have been shown by way of example in the drawings and are described in detail below. The intention, however, is not to limit the technology to the selected implementations described. On the contrary, the technology is intended to cover all modifications, equivalents, and alternatives falling within the scope of the technology as defined by the appended claims.

DETAILED DESCRIPTION

The disclosed technology relates to a wireless communication device operating two wireless communication protocols. More specifically, the disclosed technology includes a hearing device that is configured to enable two different wireless communication protocols such that the two wireless communication protocols coexist or operate simultaneously. One implementation of this technology includes a hearing device streaming audio with one wireless communication protocol and advertising its availability with another wireless communication protocol.

To operate two wireless communication protocols, a hearing device can align timing of the protocols and adjust time between advertising events of at least one protocol to reduce collisions. Here, collisions generally mean reducing a situation when a first wireless communication protocol and a second wireless communication protocol each request to transmit or receive a packet (also referred to as "packet collisions"). Specifically, in some implementations, a controller of the hearing devices aligns a timing of audio frames of a first wireless communication protocol with a timing of advertising events of a second wireless communication protocol to reduce packet collision between the first wireless communication protocol and the second wireless communication protocol. The controller can also increase a time duration between beginnings of advertising Protocol Data Units (PDUs) transmitted during an advertising event of the second wireless communication protocol.

Also, a hearing device can assign priority to requests to prefer one protocol over another protocol to handle simultaneous requests from two wireless communication protocols. Here, the hearing device can select one of two requests based on priority, which allows the hearing device to process simultaneous requests more efficiently. If the controller receives a first request to access a transceiver of the wireless communication device from the first wireless communication protocol and receives a second request to access the transceiver of the wireless communication device from the second wireless communication protocol at the same time, it can select the second request from the second wireless communication protocol to be executed based on priority of the second wireless communication protocol over the first wireless communication protocol.

The disclosed technology solves at least the technical problem of reducing overlapping requests to access a transceiver or audio artifacts in wireless communication for a hearing device and provides additional technical benefits. For example, the disclosed technology enables two wireless protocols to function simultaneously while reducing the impact on audio quality in an audio stream. Another advantage is that the disclosed technology enables two wireless protocols to operate simultaneously with a performance similar to when they operate separately (e.g., delay and packet collisions are minimized).

FIG. 1 illustrates a communication environment 100. The communication environment 100 includes wireless communication devices 102 and hearing devices 103. As shown by double-headed bold arrows in FIG. 1, the wireless devices 102 and the hearing devices 103 can communicate wirelessly, e.g., each wireless communication device 102 can communicate with each hearing device and each hearing device can communicate with the other hearing device. Wireless communication can include using a protocol such as Bluetooth BR/EDR™, Bluetooth Low Energy™, a proprietary communication (e.g., binaural communication protocol between hearing aids or bimodal communication protocol between a hearing aid and hearing device), ZigBee™, Wi-Fi™, or an Industry of Electrical and Electronic Engineers (IEEE) wireless communication standard.

A hearing device user can wear the hearing devices 103 and the hearing devices 103 can be streaming audio between the devices. Streaming audio between the devices can include during wind noise canceling, during hearing device programs (e.g., hearing aids that exchange audio information). The hearing devices 103 can also be advertising their status via Bluetooth Low Energy™. For example, while simultaneously streaming audio information between the hearing devices 103, each hearing device 103 can exchange data or advertise its status to a mobile device or a fitting station. A fitting station is a computing device used by a doctor or professional to fit a hearing device.

To operate the two wireless communication protocols simultaneously, the hearing devices 103 (or a single hearing device 103) can modify a timing of a wireless communication protocol, modify a time duration between beginnings of advertising packets transmitted during an advertising event of a wireless communication protocol, determine priority of a wireless communication protocol compared to another wireless communication protocol, or adjust a wireless communication protocol to reduce packet interference based on reducing times when more than one wireless communication protocol are transmitting or receiving packets, which is explained in more detail in FIGS. 2, 3, 4A-4B, and 5. For example, the hearing device 103 can stream audio information from another hearing device 103 using a binaural streaming protocol while simultaneously communicating with a mobile phone device using Bluetooth Low Energy™.

The wireless communication devices 102 are computing devices that are configured to wirelessly communicate. Wireless communication includes wirelessly transmitting information, wirelessly receiving information, or both. The wireless communication devices 102 shown in FIG. 1 include computers (e.g., desktop or laptop), televisions (TVs) or components in communication with television (e.g., TV streamer), a car audio system or circuitry within the car, a mobile device (e.g., smartphone), tablet, remote control, an accessory electronic device, a wireless speaker, or watch. It should be noted that the hearing device 103 is also a wireless communication device 102, but the hearing device 103 can provide audio to a user in addition to wirelessly communicating with other devices.

The hearing devices 103 are devices that provide audio to a user wearing the hearing devices. Some example hearing devices include hearing aids, headphones, earphones, assistive listening devices, or any combination thereof; and hearing devices include both prescription devices and non-prescription devices configured to be worn on or near a human head. As an example of a hearing device, a hearing aid is a device that provides amplification, attenuation, or frequency modification of audio signals to compensate for hearing loss or attenuation functionalities; some example hearing aids include a Behind-the-Ear (BTE), Receiver-in-the-Canal (RIC), In-the-Ear (ITE), Completely-in-the-Canal (CIC), Invisible-in-the-Canal (IIC) hearing aids or a cochlear implant (where a cochlear implant includes a device part and an implant part).

The hearing devices 103 are configured to binaurally communicate or bimodally communicate. The binaural communication can include a hearing device 103 transmitting information to or receiving information from another hearing device 103. Information can include volume control, signal processing information (e.g., noise reduction, wind canceling, directionality such as beam forming information), or compression information to modify sound fidelity or resolution. Binaural communication can be bidirectional (e.g., between hearing devices) or unidirectional (e.g., one hearing device receiving or streaming information from another hearing device). Bimodal communication is like binaural communication, but bimodal communication includes a cochlear device communicating with a hearing aid.

Figure 2:
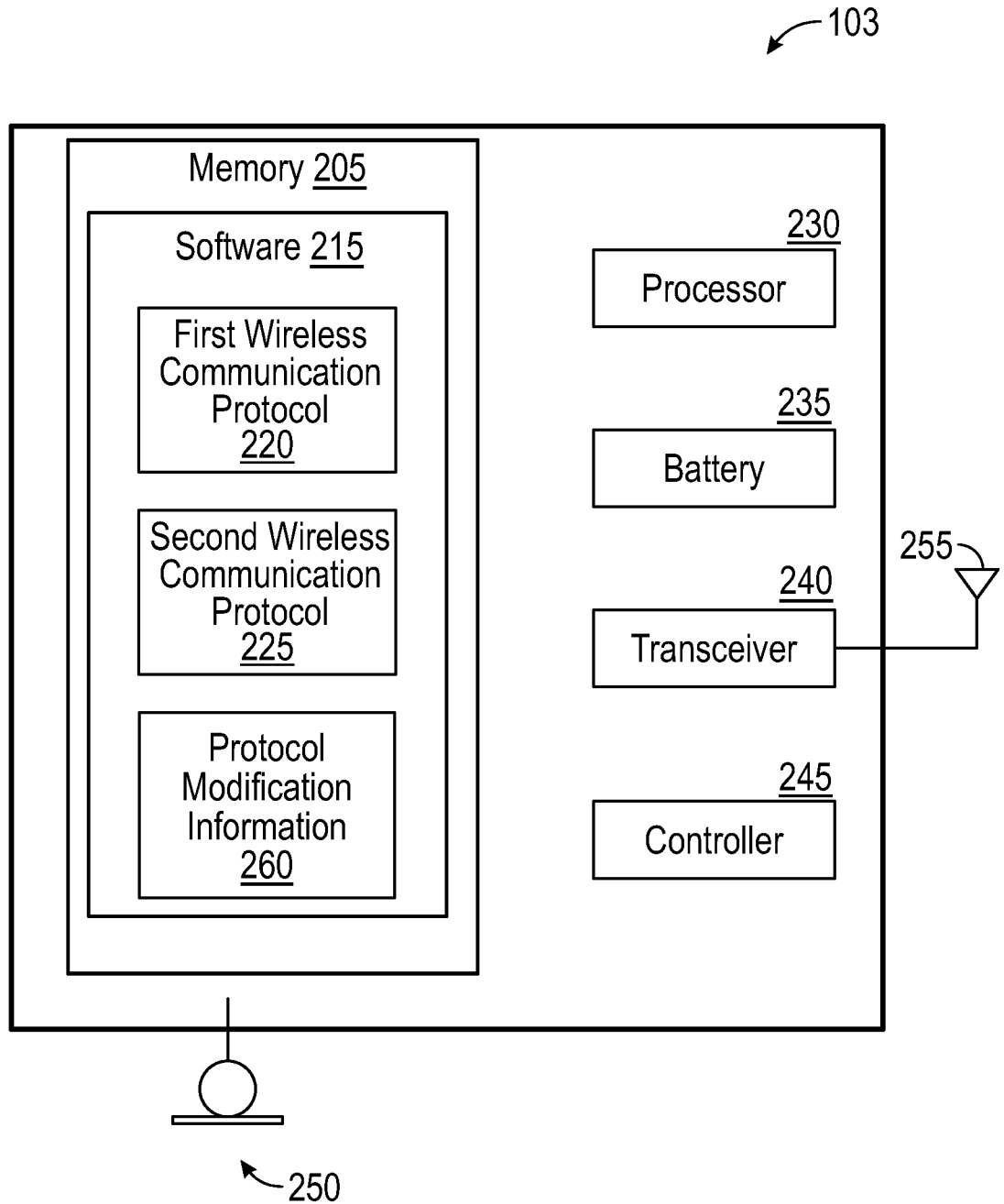
FIG. 2 illustrates a hearing device from FIG. 1 in more detail in accordance with some implementations of the disclosed technology.

FIG. 2 is a block diagram illustrating the hearing device 103 from FIG. 1 in more detail. FIG. 2 illustrates the hearing device 103 with a memory 205, software 215 stored in the memory 205, the software 215 includes a first wireless communication protocol 220 and a second wireless communication protocol 225, and protocol modification information 260. The first and second wireless communication protocols are a system of rules that allow two or more devices to wirelessly communicate information. The hearing device 103 also includes a processor 230, a battery 235, a transceiver 240, a controller 245, a microphone 250, and an antenna 255.

The memory 205 stores instructions for executing the software 215 comprised of one or more modules and data utilized by the modules. The modules perform certain methods or functions for the hearing device 103 and can include components, subcomponents, or other logical entities that assist with or enable the performance of these methods or functions. For example, the modules can store algorithms for carrying out a wireless communication protocol that includes transmitting and receiving information. Although a single memory 205 is shown in FIG. 2, the hearing device 103 can have multiple memories 205 that are partitioned or separated, where each memory can store different information.

The first wireless communication protocol 220 can be a synchronous protocol configured to stream audio. Synchronous generally means that data is sent in a continuous stream at a constant rate, which also generally means clock synchronization in transmitting and receiving wireless communication devices. The first wireless communication protocol 220 can operate in the unlicensed radio band (e.g., Industrial, Scientific, and Medical (ISM) band) using a frequency of 2.4 GHz.

Examples of the first wireless communication protocol include a binaural voice streaming protocol configured for low-latency audio streaming between hearing devices. Low latency generally means less than 20 milliseconds end-to-end audio latency (e.g., less than 10 milliseconds). The binaural voice streaming protocol can be configured to provide audio to each hearing device during a wind noise operation in a hearing program that streams sound from one hearing device to another hearing device worn by the same user.

The second wireless communication protocol 225 can be a wireless communication protocol configured for communication with any wireless communication device. The second wireless communication protocol 225 can operate in the unlicensed radio band (e.g., ISM band) using a frequency of 2.4 GHz. The second wireless communication protocol 225 can be a low energy wireless communication protocol, which generally means it transmits or receives 1 megabit (Mb) per second while consuming less than 0.6 Watts. An example of the second wireless communication protocol 225 can be Bluetooth Low Energy™ or ZigBee™.

The memory 205 can also store the protocol modification information 260. The protocol modification information 260 is information related to how to modify the first or the second wireless communication protocol to reduce packet collision (e.g., instructions for a processor or controller). The protocol modification information 260 can include priority information and time aligning information. Priority information can include information that the controller 245 can use to determine whether a request from the first or second wireless communication protocol has a higher priority. If the first wireless communication protocol is a binaural streaming protocol for hearing devices and the second wireless communication protocol includes advertising, the protocol modification information 260 can store information that the second wireless communication protocol has a higher priority than the first wireless communication protocol. The controller 245 can use this priority information to process simultaneous requests from the first and the second wireless communication protocol because it will select the higher priority request based on priority of the protocols.

Time aligning information can include the start and end of audio frames in a wireless communication protocol, the start and end of advertising events, the start and end of packets transmitted and received on different advertising channels during an advertising event, the start and end of packets transmitted and received in an audio frame, and built in delays associated with the different protocols.

The processor 230 can include special-purpose hardware such as application specific integrated circuits (ASICs), programmable logic devices (PLDs), field-programmable gate arrays (FPGAs), programmable circuitry (e.g., one or more microprocessors microcontrollers), Digital Signal Processor (DSP), appropriately programmed with software and/or computer code, or a combination of special purpose hardware and programmable circuitry.

Also, although the processor 230 is shown as a separate unit in FIG. 2, the processor 230 can be on a single chip with the transceiver 240, the controller 245, and the memory 205. The processor 230 can also include a DSP configured to modify audio signals based on hearing loss. In some implementations, the hearing device 103 can have multiple processors, where the multiple processors can be physically coupled to the hearing device 103 and configured to communicate with each other.

The battery 235 can be a rechargeable battery (e.g., lithium ion battery) or a non-rechargeable battery (e.g., Zinc-Air) and the battery 235 can provide electrical power to the hearing device 103 or its components.

The microphone 250 is configured to capture sound and provide an audio signal of the captured sound to the processor 230. The processor 230 can modify the sound (e.g., in a DSP) and provide the modified sound to a user of the hearing device 103. Although a single microphone 250 is shown in FIG. 2, the hearing device 103 can have more than one microphone. For example, the hearing device 103 can have an inner microphone, which is positioned near or in an ear canal, and an outer microphone, which is positioned on the outside of an ear. As another example, the hearing device 103 can have two microphones, and the hearing device 103 can use both microphones to perform beam forming operations. In such an example, the processor 230 would include a DSP configured to perform beam forming operations.

The controller 245 controls transmission or reception of packets based on requests from the first wireless communication protocol 220, the second wireless communication protocol 225, or other requests from the hearing device 103 (e.g., from the processor 230). The controller 245 can be implemented in hardware (e.g., part of the processor 230 or be a separate unit), software (e.g., part of software 215), or a combination of software and hardware. The controller 245 can be configured to communicate with the transceiver 240 to transmit or receive packets.

The controller 245 can also be configured to enable the first and second wireless communication protocols to operate simultaneously with reduced packet collisions. In some implementations, the controller 245 is configured to: increase a time duration between beginnings of advertising packets transmitted during an advertising event of the second wireless communication protocol, time align the first wireless communication protocol and the second wireless communication protocol to reduce packet collision between the first wireless communication protocol and the second wireless communication protocol, and select a request from the second wireless communication protocol over a request from the first wireless communication protocol based on priority of the second wireless communication protocol 225. The controller 245 communicates with the transceiver 240. The transceiver 240 communicates with the antenna 255 to transmit or receive information.

As shown in FIG. 2, the hearing device 103 has a single shared transceiver 240. This generally means that the first and second wireless communication protocols share "the shared transceiver 240" to transmit or receive packets. This can also be referred to as a "common" transceiver 240. However, the disclosed technology can be modified to work with a wireless communication device 102 that has more than 1 transceiver (e.g., 2) or more than 1 antenna. In such implementations with more than 1 transceiver or more than 1 antenna, the disclosed technology would reduce the collision of packets if both the first and second wireless communication request to transmit or receive packets using separate or different transceivers or antennas. Also, because the disclosed technology reduces overlapping requests to access a shared transceiver the disclosed technology also reduces packet collisions because fewer packets are transmitted or received in traffic than if the protocols are operating separately (without modification).

As an example, when the first wireless communication protocol 220 wants to access or use the antenna 255 to transmit or receive a packet, it can request access to the transceiver 240 via the controller 245. If the controller 245 determines that the protocol can have access to the transceiver 240, it will allow the request; if determines that the protocol cannot have access, it will deny the request or ask it to wait.

The antenna 255 is configured to operation in unlicensed bands such as Industrial, Scientific, and Medical Band (ISM)) using a frequency of 2.4 GHz. The antenna 255 can also be configured to operation in other frequency bands such as 5 GHz, 5 MHz, 10 MHz, or other unlicensed bands.

Although not shown in FIG. 2, the hearing device 103 can also include a transducer to output audio signals (e.g., a loudspeaker or a transducer for a cochlear device configured to convert audio signals into nerve stimulation or electrical signals).

Figure 3:
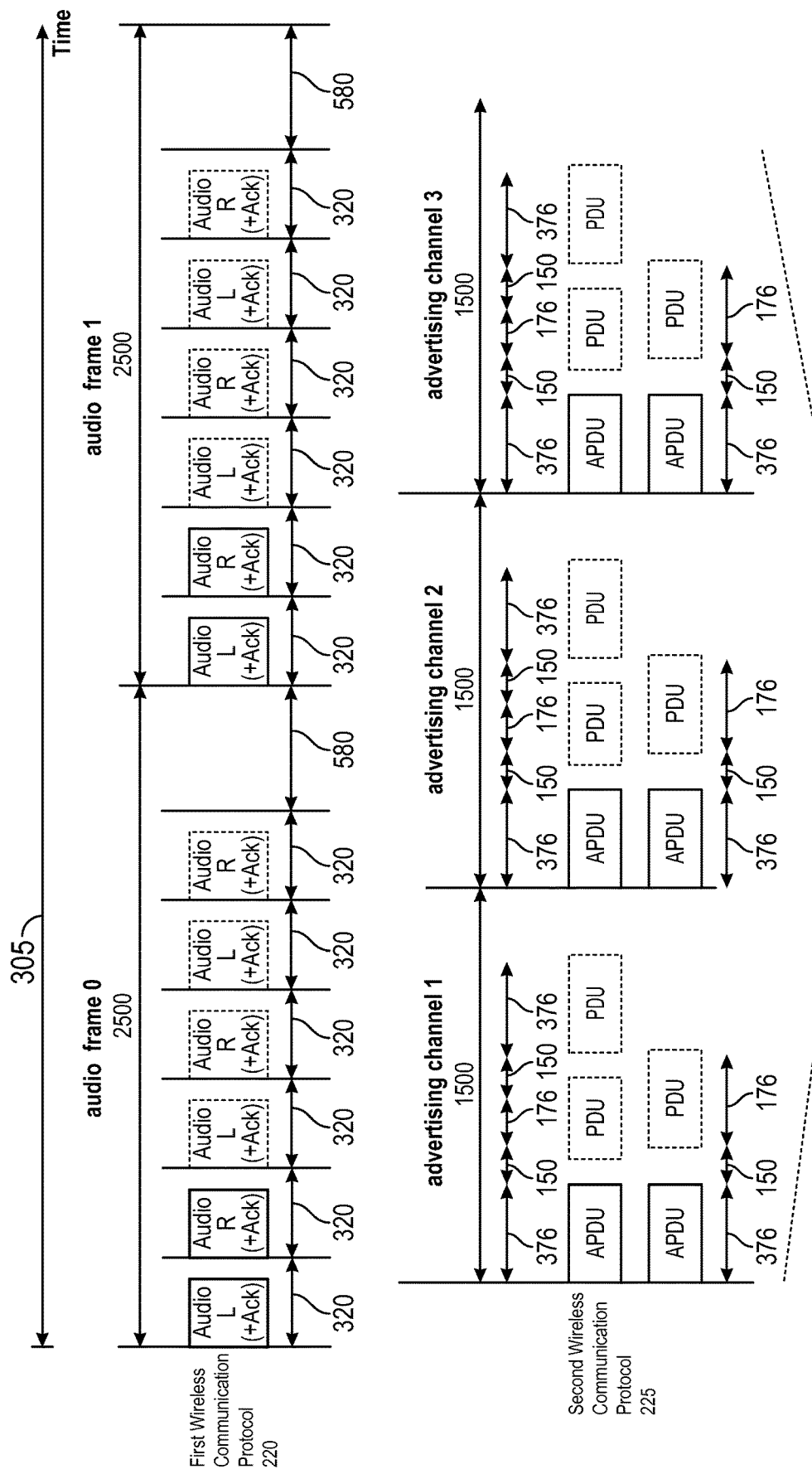
FIG. 3 illustrates a schematic diagram of two wireless communication protocols prior to modification by a controller in accordance with some implementations of the disclosed technology.

FIG. 3 illustrates a schematic diagram of the first wireless communication protocol 220 and the second wireless communication protocol 225 prior to modification by the controller 245. The top of FIG. 3 includes a timeline 305 for chronological reference. Below the timeline 305, the first wireless communication protocol 220 has audio frames (e.g., "Audio Frame 0", "Audio Frame 1"). The first wireless communication protocol 220 can have audio frames lasting for a duration, where the duration depends on the described properties of the wireless communication protocol. In some implementations, as shown in FIG. 3, the audio frames last 2500 microseconds, the audio frames include audio packets for the left and right audio information (e.g., "Audio L (+Ack)" for a left side hearing device and "Audio R (+Ack)"

for a right-side hearing device). Audio frames refer to a frame for the first wireless communication protocol for transmitting or receiving audio information and acknowledgment of the audio information.

The first wireless communication protocol 220 enables a low-latency audio stream. For example, the first wireless communication protocol is an isochronous protocol implementing a Time Division Multiple Access (TDMA) scheme with a short interval of a few milliseconds. It is typical for low-latency audio protocols to use a significant amount of bandwidth (e.g., more than 40% of available bandwidth) to ensure sufficient audio quality in situations of poor wireless connectivity (e.g., wireless connectivity below a threshold bandwidth or latency such that a minimum quality of service is not possible).

The first wireless communication protocol 220 can be a binaural voice streaming (BVST) for two hearing devices. In BVST, a hearing device transmits a new audio packet every TDMA frame of 2.5 milliseconds (see FIG. 3 that shows "Audio Frame 0" is 2500 microseconds or 2.5 milliseconds). In a bidirectional streaming operation, each audio source has up to 3 attempts to transmit the same audio packet as shown by the dashed lines around the packets in FIG. 3 (e.g., "Audio L" and "Audio R"). Packets with a solid line, which are the first two packets in Audio Frame 0 and Audio Frame 1, are transmitted during 320 microsecond intervals. If a packet is not acknowledged, then the hearing device retransmits the packet as illustrated by the additional audio packets in dashed lines. Specifically, automatic repeat requests are based on acknowledgments transmitted in dedicated "Ack" packets or piggybacked into audio packets. At the end of the Audio Frame 0, there is a 580 microsecond time period before the next frame Audio Frame 1, which is also 2500 microseconds in duration. The audio frames are repeated every 2500 microseconds during a streaming operation.

Continuing with FIG. 3, the second wireless communication protocol 225 illustrates an advertising event for the second wireless communication protocol 225. During an advertising event a device transmits advertising packets on one or more advertising channels. An advertising channel is a physical channel in a wireless frequency band (e.g., in the 2.4 GHz band), where each channel is separated by a frequency (e.g., 2 MHz or a multiple thereof in the 2.4 GHz ISM band). The advertising packets can include information about the advertising device such as a request or availability. Although the second wireless communication protocol 225 can have several channels, it generally uses only few for advertising. For example, Bluetooth Low Energy™ has at least three dedicated channels for advertising and more than 35 for data transmission and reception.

In FIG. 3, the second wireless communication protocol 225 has advertising channel 1 that lasts 1500 microseconds, advertising channel 2 that lasts 1500 microseconds, and advertising channel 3 that lasts 1500 microseconds. Although 1500 microseconds is the duration of the of an advertising channel in FIG. 3, the duration can be longer or shorter than that (e.g., the duration can be 10000 microseconds or less for Bluetooth Low Energy™). The three advertising channels can be used to beacon or match a long-term connection with a phone, device, or computer. Also, in Bluetooth Low Energy™, the advertising channels can be primary advertising channels 37, 38, and 39, where primary means the channels are primarily used for advertising. It is known that Bluetooth Low Energy™ has channels for advertising and channels for other types of communication.

Each advertising event consists of up to 3 Protocol Data Units (PDUs or a single PDU) transmitted on the advertising channels to broadcast data and to allow other devices to find and connect with the transmitting device. In general, the first PDU is an advertising PDU (APD), which generally means it is a packet with information related to advertising status of the wireless communication device. For example, if the second wireless communication protocol is Bluetooth Low Energy™, PDUs on primary advertising channels can be connectable and scannable undirected advertising indications ("ADV_IND"), directed advertising indications ("ADV_DIRECT_IND"), non-connectable and non-scannable undirected advertising indications ("ADV_NONCONN_IND"), scannable undirected advertising indications ("ADV_SCAN_IND"), or extended advertising indications ("ADV_EXT_IND"). ADV_IND are related to a peripheral device indicating that it can be connected or scanned from central devices (e.g., not directed at a central device); ADV_DIRECT_IND are for connectable directed advertisement (e.g., to a device); ADV_NONCONN_IND are for non-connectable and non-scannable undirected advertisement; and ADV_SCAN_IND are for non-connectable scannable indications. The Bluetooth Low Energy™ specifications require the time duration between beginnings of two consecutive advertising PDUs transmitted during an advertising event to be less than or equal to 10000 microseconds. Advertising events generally repeat every advertising interval plus advertising delay. For example, an advertising interval is an integer multiple of 0.625 milliseconds in the range of 20 milliseconds to 10.24 seconds and advertising delay is a pseudo-random value with a range of 0 milliseconds to 10 milliseconds generated for each advertising event.

Normally and as shown in FIG. 3, advertising events tend to be as short as possible to reduce interference (e.g., minimize) and improve coexistence with other protocols that are not time synchronized with the advertising protocol timings. However, this is not a viable approach when Bluetooth Low Energy™ advertising coexists with a low-latency audio stream that employs a short frame period such as the first wireless communication protocol 220 because a single Bluetooth Low Energy™ advertising event can collide with one or more entire audio frames and cause noticeable audio artefacts. Accordingly, when two hearing devices want to stream or a single hearing device wants to stream and use Bluetooth Low Energy™ to advertise its status, the disclosed technology modifies the two wireless communication protocols to reduce packet collision and thus reduce artifact generation as explained in FIGS. 4A-4C.

Figure 4A:
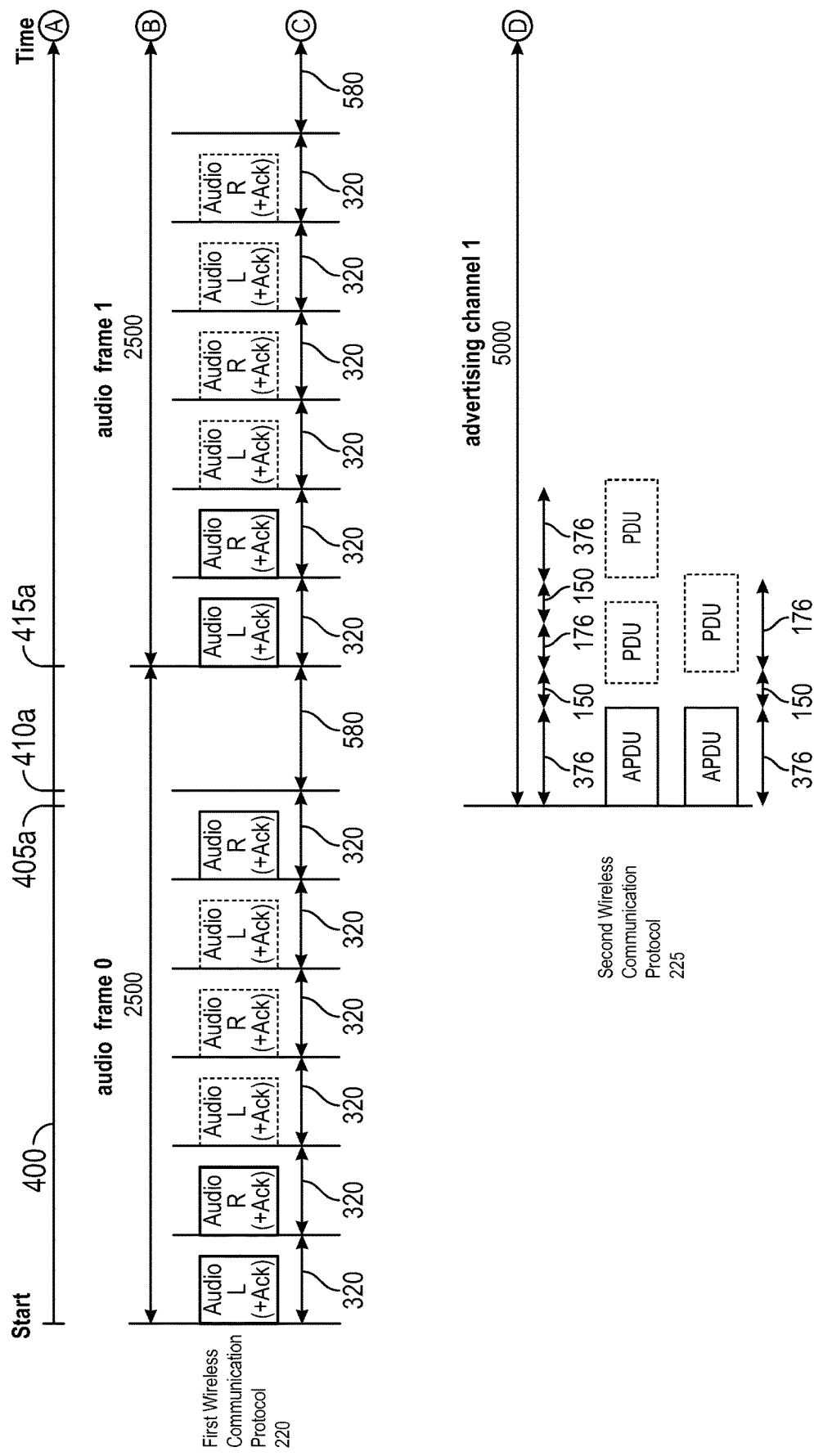
FIGS. 4A, 4B, and 4C illustrate schematic diagrams of two wireless communication protocols after modification by a controller in accordance with some implementations of the disclosed technology.
Figure 4B:
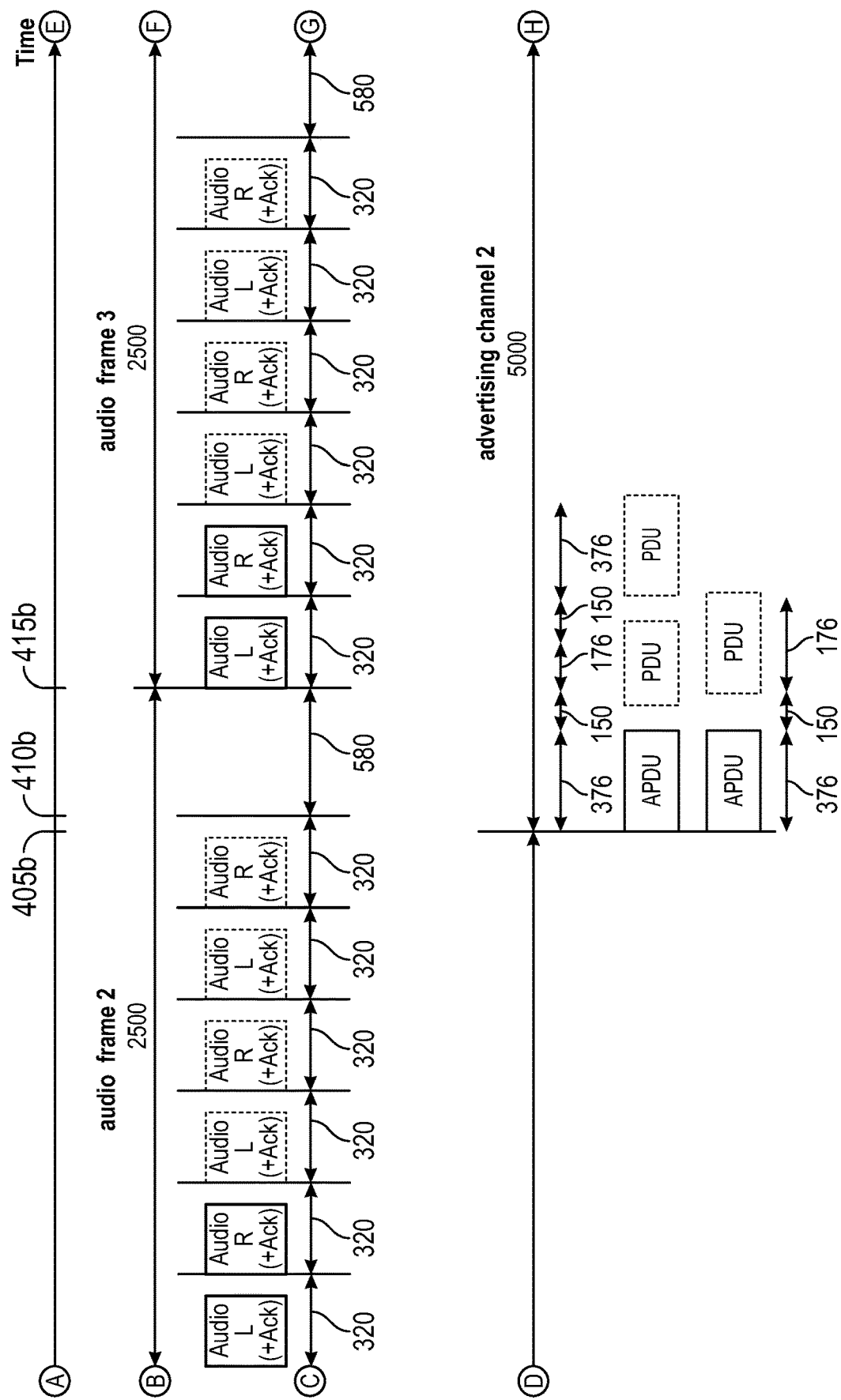
Figure 4C:
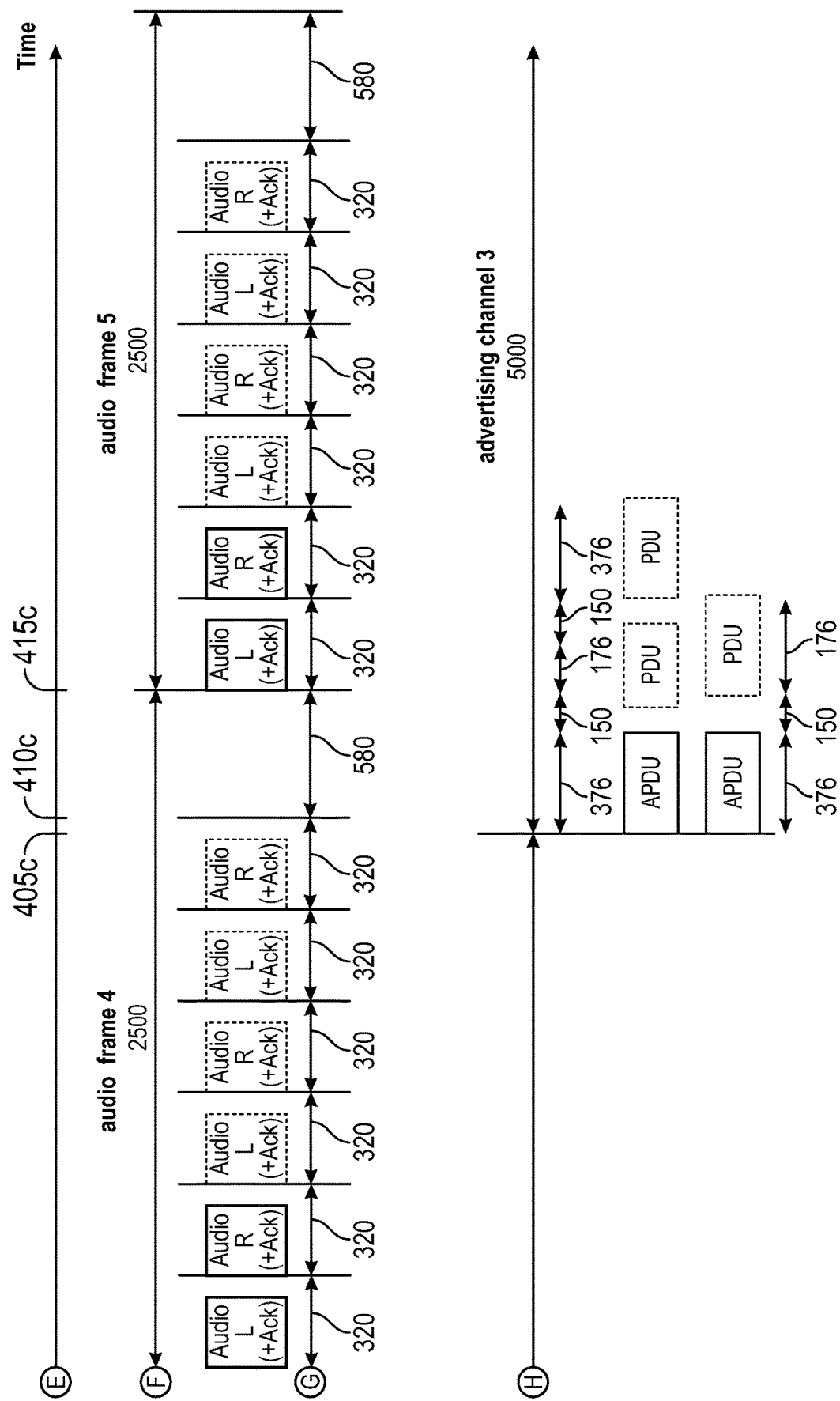

FIGS. 4A, 4B, and 4C illustrate schematic diagrams of two wireless communication protocols during a streaming operation after modification by a controller to reduce packet collision. At the top of FIGS. 4A, 4B, and 4C is a timeline 400 for reference. The timeline 400 has marked time events: end of data transmission for the first wireless communication protocol 220 shown by mark 405a, the beginning of data transmission by the second wireless communication protocol 225 shown by mark 410a, and the beginning of the new audio frame 1 shown by mark 415a. Also, FIGS. 4A, 4B, and 4C are arranged chronologically, which is illustrated by the connecting lines (e.g. "A to A", "B to B", "C to C", etc.).

FIGS. 4A, 4B, and 4C are like FIG. 3 in that there is a first and a second wireless communication protocol; however, a controller has modified the timing of the wireless communication protocols to avoid situations of unfavorable alignment and packet collisions. Specifically, the controller implements two features that improve the coexistence of the two wireless communication protocols: (1) time aligning and (2) increased time duration between beginnings of advertising packets transmitted during an advertising event.

Regarding time aligning of the two wireless communication protocols, the timing of the first wireless communication protocol and the second wireless communication protocol may change over time and alignments the packets of each protocol collide and the causes unwanted artifacts. Accordingly, the controller 245 aligns the audio frames of the first wireless communication protocol with advertising events of the second wireless communication protocol to reduce (e.g., minimize) audio artifacts, which can be created by packet collision or packet loss. Specifically, as shown in FIG. 4A, the advertising channel 1 starts after all the audio frame time slots of audio frame 0 in wireless protocol (see marks 405*a* and 410*a*), which reduces the collision of an audio packet with an advertising event. Also, next audio frame (e.g., audio frame 1) starts after first transmission of the first PDU in the advertising channel 1 (see the timeline mark 415*a*). Because of this time aligning, the transmission of the first PDU in an advertising channel by the second wireless communication protocol 225 does not collide with any transmission or reception of audio packets by the first wireless communication protocol 220. Only optional reception or transmission of PDUs after the first PDU in an advertising channel of the second wireless communication protocol 225 (e.g., connection indication, scan request, or scan response) would collide with transmission or reception of audio packets by the first wireless communication protocol 220.

Additionally, the time duration between beginnings of advertising packets transmitted during an advertising event for the second wireless communication protocol 225 is increased to reduce packet collision. Comparing FIG. 3 to FIG. 4A, the time duration between the beginning of two consecutive advertising PDUs transmitted on advertising channels increased from 1500 microseconds (FIG. 3) to 5000 microseconds (FIG. 4A), which is an approximately 333% increase in time duration. In contrast to most protocol where it is advantageous to keep the advertising events as short as possible (e.g., a short time duration) to avoid collisions, the controller has increased the time duration, but at the same time it is has reduced packet collisions as shown in FIG. 4A. Specifically, the advertising PDUs of the second wireless communication protocol do not collide with any packets of the first audio frame 0 of the first wireless communication protocol, and in the worst case, two optional PDUs (shown in dashed lines) collide with the beginning of audio frame 1 and the first audio packets of audio frame 1. Further, even though the advertising channel has been extended to span across two audio frames (e.g., audio frame 0 and 1), it is unlikely that the packet collision results because the packets are spaced in a manner to avoid collision.

Like FIG. 4A, FIGS. 4B and 4C illustrate the time aligning and increased time duration for the next audio frames and advertising channels. Specifically, FIG. 4B includes marks 405*b*, 410*b*, 415*c*, which are like marks 405*a*, 405*b*, and 415*c*, and illustrate the time alignment of the two protocols. Also, the advertising channel 2 starts during audio frame 2, but only after the time slots all the audio packets of audio frame 2 have been transmitted and/or acknowledged. Like FIG. 4B, FIG. 4C has timeline marks 405*c*, 410*c*, 415*c*, which are like marks 405*b*, 410*b*, and 415*b*, and illustrate the time alignment of the two protocols to reduce packet collision.

Although FIGS. 3 and 4A-4C show a bidirectional streaming operation, the first wireless communication protocol 220 can also perform unidirectional streaming (e.g., streaming unidirectionally from one hearing device to another hearing device), wherein the hearing device or audio source (e.g., wireless communication device) has up to 4 attempts to transmit the same audio packet. Because the bidirectional streaming case takes up more bandwidth than the unidirectional streaming case, the bidirectional streaming case is mostly discussed in this section as it causes more collisions than the unidirectional case, but the techniques of this disclosed here apply equally to the unidirectional case.

Figure 5:
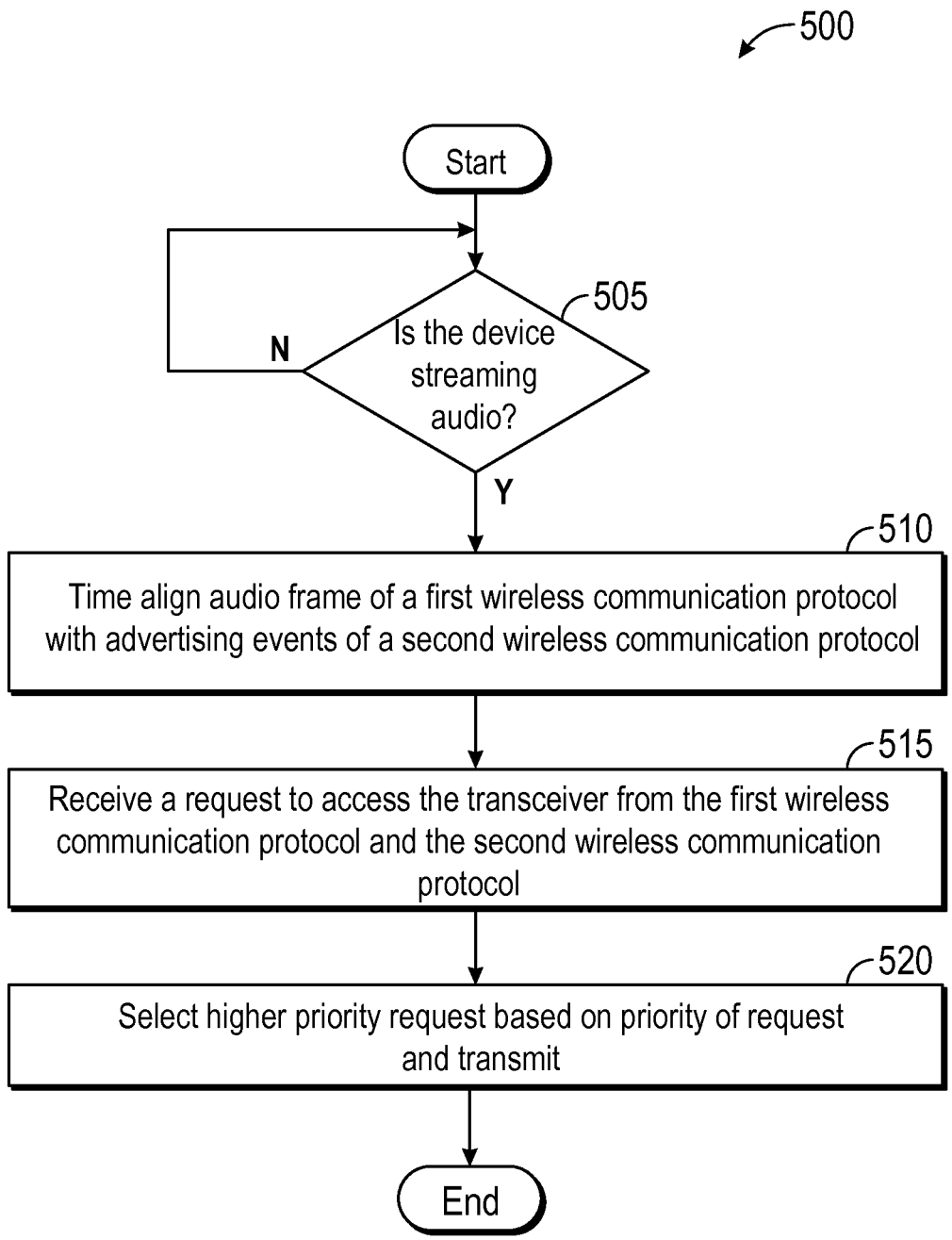
FIG. 5 illustrates a block flow diagram for a hearing device enabling two wireless communication protocols in accordance with some implementations of the disclosed technology.

FIG. 5 illustrates a block flow diagram for a process 500 for using two protocols for a hearing device (e.g., hearing device 103 from FIG. 1 and FIG. 2). A hearing device can execute the process 500 or another computing device can execute the process 500. In some implementations, part of the process may be carried out on more than one device (e.g., two hearing devices perform the process or a hearing device and mobile perform the process 500). The process 500 begins with operation 505 and continues with operation 510.

At streaming decision operation 500, the hearing device determines that it is performing or will shortly perform (e.g., within 3 seconds) a streaming operation. The hearing device can determine that it is streaming based on a user request (e.g., to listen to music) or based on a request. For example, another device may request that the hearing device stream music or a component within the hearing device may request that it stream audio based on a program change (e.g., wind noise cancelation).

The streaming operation can include streaming audio from one hearing device to another hearing device including unidirectional streaming or bidirectional streaming. For example, a left hearing device can stream audio from a right hearing device or a right hearing device can stream audio from a second hearing device. The streaming can include the repetition of audio packets and an acknowledgement of reception as disclosed in FIG. 3. For example, a left hearing device can transmit one packet of audio and wait for an acknowledge of receipt and a right hearing device can transmit a packet of audio and wait for an acknowledgement, and this process can be repeated 2, 3, 4, or more times depending on desired error rate and available resources of hearing device. If the hearing device determines that it is streaming audio, it will continue to next operation 510. If the hearing device determines that it will not stream audio, it can remain at the streaming decision operation 500 (e.g., wait for a request to stream audio).

At time align operation 510, the hearing device time aligns the first wireless communication protocol and the second wireless communication protocol to reduce packet collision. Specifically, a timing of the audio frames of the first wireless communication protocol is time aligned with the timing of the advertising events of the second wireless communication protocol. The timing is aligned such that audio packets of the first wireless communication protocol in an audio frame are all transmitted and/or received and then at least the first PDUs on every advertising channel of an advertising event of the second wireless protocol are transmitted before the end of the audio frame. For example, for a binaural streaming protocol and Bluetooth Low Energy™, the binaural streaming protocol transmits the left audio packet and receives an acknowledgement, the right audio packet and receives and acknowledgement, and the remaining slots left for repeated audio packets are not used. After the slots for the audio packets have passed, Bluetooth Low Energy™ protocol transmits its first PDU (e.g., an ADV_IND or a different advertising PDU).

At receive request operation 515, the hearing device receives requests from the first and second wireless communication protocols. For example, the first wireless communication protocol can request to access a transceiver of the hearing device to transmit audio information in an audio frame related to streaming operation and the second wireless communication protocol may also request access to the transceiver of the hearing device (e.g., simultaneously, or close in time to the first request). Because the transceiver can only execute one request at a time, the hearing device needs to decide which request will be granted and which will be denied or ignored.

At select and transmit request operation 520, based on receiving a request from the first and second wireless communication protocol, the hearing device determines whether to transmit the first request or the second request. In some implementations, the first and second requests are received simultaneously. The hearing device can make this determination based on a set priority of protocols. Specifically, the hearing device can favor access to a transceiver for one protocol over access to the transceiver of another protocol. For example, when a binaural streaming protocol and a Bluetooth Low Energy™ protocol access to access the transceiver for the hearing device, the hearing device can allow the Bluetooth Low Energy™ protocol to access the transceiver over the binaural streaming protocol. This priority can be based on preferences and adjusted. Having the Bluetooth Low Energy™ favored enables the hearing device to continue advertising or accept connection requests while streaming audio even though the streaming may experience an artifact because of the audio stream not being able to access the transceiver during Bluetooth Low Energy™ transmission or reception.

After the select and transmit request operation 520, the process 500 can be repeated entirely, repeated partially (e.g., repeat only operation 515), or stop. For example, if it is determined that the hearing is no longer streaming audio, the hearing device can discontinue the time aligning of the timing of audio frames of the first wireless communication protocol with the timing of advertising events of the second wireless communication protocol and decrease the time duration between beginnings of advertising packets transmitted during an advertising event of the second wireless communication protocol.

Aspects and implementations of the process 500 of the disclosure have been disclosed in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware such with a wireless communication device or a hearing device.

The phrases "in some implementations," "according to some implementations," "in the implementations shown," "in other implementations," and generally mean a feature, structure, or characteristic following the phrase is included in at least one implementation of the disclosure, and may be included in more than one implementation. In addition, such phrases do not necessarily refer to the same implementations or different implementations.

The techniques introduced here can be embodied as special-purpose hardware (e.g., circuitry), as programmable circuitry appropriately programmed with software or firmware, or as a combination of special-purpose and programmable circuitry. Hence, implementations may include a machine-readable medium having stored thereon instructions which may be used to program a computer (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. In some implementations, the machine-readable medium is non-transitory computer readable medium, where in non-transitory excludes a propagating signal.

The above detailed description of examples of the disclosure is not intended to be exhaustive or to limit the disclosure to the precise form disclosed above. While specific examples for the disclosure are described above for illustrative purposes, various equivalent modifications are possible within the scope of the disclosure, as those skilled in the relevant art will recognize. For example, while processes or blocks are presented in an order, alternative implementations may perform routines having steps, or employ systems having blocks, in a different order, and some processes or blocks may be deleted, moved, added, subdivided, combined, or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc. As another example, "A or B" can be only A, only B, or A and B.

We claim:

1. A method for a wireless communication device to communicate using a shared transceiver, the method comprising:
aligning a timing of audio frames of a first wireless communication protocol with a timing of advertising events of a second wireless communication protocol to reduce overlapping requests to access a shared transceiver from the first wireless communication protocol and the second wireless communication protocol;
increasing a time duration between beginnings of advertising packets transmitted during an advertising event of the second wireless communication protocol;
receiving a first request to access the shared transceiver of the wireless communication device from the first wireless communication protocol and receiving a second request to access the transceiver of the wireless communication device from the second wireless communication protocol; and
selecting the second request from the second wireless communication protocol to be executed based on priority of the second wireless communication protocol over the first wireless communication protocol.

2. The method of claim 1, wherein the aligning causes packets of every audio frame of the first wireless communication protocol not to overlap with packets on advertising channels of the second wireless communication protocol or causes the packets of every audio frame of the first wireless communication protocol to overlap with packets of only a single advertising channel on the second wireless communication protocol.

3. The method of claim 1, wherein the wireless communication device is a hearing device, and the method further comprising:
  determining that the hearing device is streaming audio information from another hearing device.

4. The method of claim 3, the method further comprising:
  determining that the hearing device is no longer streaming audio information;
  discontinuing the aligning of the timing of audio frames of the first wireless communication protocol with the timing of advertising events of the second wireless communication protocol; and
  decreasing the time duration between beginnings of advertising packets transmitted during an advertising event of the second wireless communication protocol.

5. The method of claim 3, wherein increasing the time duration causes the time duration between beginnings of two consecutive advertising packets transmitted during an advertising event of the second wireless communication protocol to be a multiple of a duration of an audio frame of the first wireless communication protocol.

6. The method of claim 1, wherein the aligning causes the time duration between beginnings of two consecutive advertising events of the second wireless communication protocol to be a multiple of a duration of an audio frame of the first wireless communication protocol.

7. The method of claim 1, wherein the wireless communication device is a hearing device, and the method further comprising:
  determining that the hearing device is streaming audio bidirectionally or unidirectionally.

8. The method of claim 1, wherein the first wireless communication protocol is a synchronous low-latency audio streaming protocol, wherein low-latency includes end-to-end audio latency of less than 20 milliseconds.

9. The method of claim 1, wherein increasing the time duration reduces a probability of a packet of the second wireless communication protocol colliding with a reception or transmission attempt of the first wireless communication protocol.

10. The method of claim 1, wherein the first wireless communication protocol is a binaural or bimodal voice streaming protocol.

11. The method of claim 1, wherein the second wireless communication protocol is Bluetooth Low Energy™ and advertising packets correspond to advertising Protocol Data Units (PDUs) transmitted on primary advertising channels.

12. The method of claim 1, wherein the advertising event relates to a general advertising request for any connection.

13. The method of claim 1, the method further comprising:
  determining that audio streaming is no longer occurring; and
  discontinuing the aligning of the timing of the first and second wireless communication protocol.

14. The method of claim 1, wherein the first request and the second request are received simultaneously.

15. The method of claim 1, wherein the method further comprises:
  transmitting the selected second request.

16. A wireless communication device, the wireless communication device comprising:
  a memory storing a first wireless communication protocol and a second wireless communication protocol,
    the first wireless communication protocol for streaming audio, and
    the second wireless communication protocol configured to transmit advertising packets on one or more advertising channels;
  a controller, electronically coupled to the memory, for controlling transmission and reception of packets based on requests from the first wireless communication protocol and the second wireless communication protocol; and
  a shared transceiver, electronically coupled to the controller, for transmitting or receiving the packets,
  wherein
    the controller is configured to:
      increase a time duration between beginnings of advertising packets transmitted during an advertising event of the second wireless communication protocol,
      align a timing of the first wireless communication protocol and the second wireless communication protocol to reduce overlapping requests to access the shared transceiver from the first wireless communication protocol and the second wireless communication protocol, and
      select a request from the second wireless communication protocol over a request from the first wireless communication protocol based on priority of the second wireless communication protocol.

17. The wireless communication device of claim 16, wherein the first wireless communication protocol is synchronous low-latency audio streaming protocol, wherein low-latency includes end-to-end audio latency of less than 20 milliseconds.

18. The wireless communication device of claim 16, wherein the memory further comprises instructions for performing phone call streaming for the wireless communication device.

19. A non-transitory computer-readable medium storing instructions, which when executed by a processor cause a hearing device or wireless communication device to perform operations, the operations comprising:
  aligning a timing of audio frames of a first wireless communication protocol with a timing of advertising events of a second wireless communication protocol to reduce overlapping requests to access a shared transceiver from the first wireless communication protocol and the second wireless communication protocol;
  increasing a time duration between beginnings of advertising packets transmitted during an advertising event of the second wireless communication protocol;
  receiving a first request to access the shared transceiver of the wireless communication device from the first wireless communication protocol and receiving a second request to access the transceiver of the wireless communication device from the second wireless communication protocol; and
  selecting the second request from the second wireless communication protocol to be executed based on priority of the second wireless communication protocol over the first wireless communication protocol.

20. The method of claim 19, wherein the aligning causes packets of every audio frame of the first wireless communication protocol not to overlap with packets on advertising channels of the second wireless communication protocol or causes the packets of every audio frame of the first wireless communication protocol to overlap with packets of only a single advertising channel on the second wireless communication protocol.

* * * * *